US008354044B2

(12) United States Patent
Tokunaga

(10) Patent No.: US 8,354,044 B2
(45) Date of Patent: Jan. 15, 2013

(54) EL DEVICE, LIGHT-SENSITIVE MATERIAL FOR FORMING CONDUCTIVE FILM, AND CONDUCTIVE FILM

(75) Inventor: Tsukasa Tokunaga, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 446 days.

(21) Appl. No.: 12/731,294

(22) Filed: Mar. 25, 2010

(65) Prior Publication Data

US 2010/0244680 A1 Sep. 30, 2010

(30) Foreign Application Priority Data

Mar. 26, 2009 (JP) ................................ 2009-076917

(51) Int. Cl.
*C09B 67/00* (2006.01)

(52) U.S. Cl. ..................... 252/501.1; 252/502; 252/512; 252/514; 313/503; 313/506; 313/509; 428/204; 428/206; 977/742; 977/762; 977/773

(58) Field of Classification Search ............... 252/501.1, 252/502, 512, 514; 313/503, 506, 509; 428/204, 428/206; 977/742, 762, 773
See application file for complete search history.

(56) References Cited

U.S. PATENT DOCUMENTS

| | | | | |
|---|---|---|---|---|
| 3,046,432 | A * | 7/1962 | Nehrich, Jr. | 313/509 |
| 2008/0246407 | A1* | 10/2008 | Yoshida et al. | 315/169.3 |

FOREIGN PATENT DOCUMENTS

| | | |
|---|---|---|
| JP | 2001-126861 | 5/2001 |
| JP | 2004-221564 | 8/2004 |
| JP | 2004-221565 | 8/2004 |
| JP | 2006-332459 | 12/2006 |
| JP | 2007-095408 | 4/2007 |
| JP | 2007-180036 | 7/2007 |
| JP | 2009-004348 | 1/2009 |

OTHER PUBLICATIONS

Notice of Reasons for Rejection issued Aug. 14, 2012 by the Japanese Patent Office in corresponding Japanese Patent Application No. 2009-181795 with English translation, 5 pages.

* cited by examiner

*Primary Examiner* — Khanh Tuan Nguyen
(74) *Attorney, Agent, or Firm* — Young & Thompson

(57) ABSTRACT

An EL device (1), contains: a transparent support (21), a conductive layer (2), a phosphor layer (3), a reflection insulating layer (4), and a back electrode (5); wherein the conductive layer (2), the phosphor layer (3), the reflection insulating layer (4) and the back electrode (5) are provided on the transparent support (21) in this order, and wherein the conductive layer (2) includes silica in an amount of 0.05 g/$m^2$ or more.

3 Claims, 2 Drawing Sheets

EL DEVICE, LIGHT-SENSITIVE MATERIAL FOR FORMING CONDUCTIVE FILM, AND CONDUCTIVE FILM

FIELD OF THE INVENTION

The present invention relates to an EL device, a light-sensitive material for forming a conductive film, and a conductive film.

BACKGROUND OF THE INVENTION

In recent years, conductive films obtained by various production methods have been investigated. Among these conductive films, there are silver salt-basis conductive films produced by a method in which a silver halide emulsion layer is coated and then pattern-exposed so that a pattern shape having a conductive portion of silver for providing conductivity and an opening portion for ensuring transparency can be formed (see, for example, JP-A-2004-221564 ("JP-A" means unexamined published Japanese patent application), JP-A-2004-221565, JP-A-2007-95408, and JP-A-2006-332459).

Various kinds of use of the above-described silver salt-basis conductive film have been studied. The present inventor has been investigating an inorganic EL device, focusing on the use of the inorganic EL device for a planar electrode. The inorganic EL device may be obtained, for example, by a method of forming the device by sticking an integrated member of a phosphor layer, a reflection insulating layer and a back electrode on a conductive film (transparent electrode), or by a method of forming the device by printing, in the following order, a phosphor layer, a reflection insulating layer, a back electrode, and an insulating layer on a conductive film. However, when the inorganic EL device is formed by sticking as described above, in particular, when the inorganic EL device is produced by using the silver salt-basis conductive film, adhesion properties (adhesiveness) between the conductive film and the phosphor layer are not enough. If the adhesion properties are insufficient, when the device is cut, voids occur between the transparent electrode and the phosphor layer. As a result, during use of the device, or in emission of light, black-dot defects arising from the voids may occur.

SUMMARY OF THE INVENTION

The present invention resides in an EL device, comprising:

a transparent support, a conductive layer, a phosphor layer, a reflection insulating layer, and a back electrode;

wherein the conductive layer, the phosphor layer, the reflection insulating layer and the back electrode are provided on the transparent support in this order, and wherein the conductive layer comprises silica in an amount of 0.05 g/m$^2$ or more.

Further, the present invention resides in a light-sensitive material for forming a conductive film, comprising:

a transparent support, and a silver salt-containing emulsion layer provided on the transparent support;

wherein at least one of layers provided on the silver salt-containing emulsion layer side comprises silica in an amount of 0.05 g/m$^2$ or more.

Furthermore, the present invention resides in a conductive film, comprising a conductive portion formed by exposing and developing a light-sensitive material for forming a conductive film;

wherein the light-sensitive material comprises a transparent support, and a silver salt-containing emulsion layer provided on the transparent support; and wherein at least one of layers provided on the silver salt-containing emulsion layer side comprises silica in an amount of 0.05 g/m$^2$ or more.

Other and further features and advantages of the invention will appear more fully from the following description, taking the accompanying drawing into consideration.

DETAILED DESCRIPTION OF THE INVENTION

Figure 1:
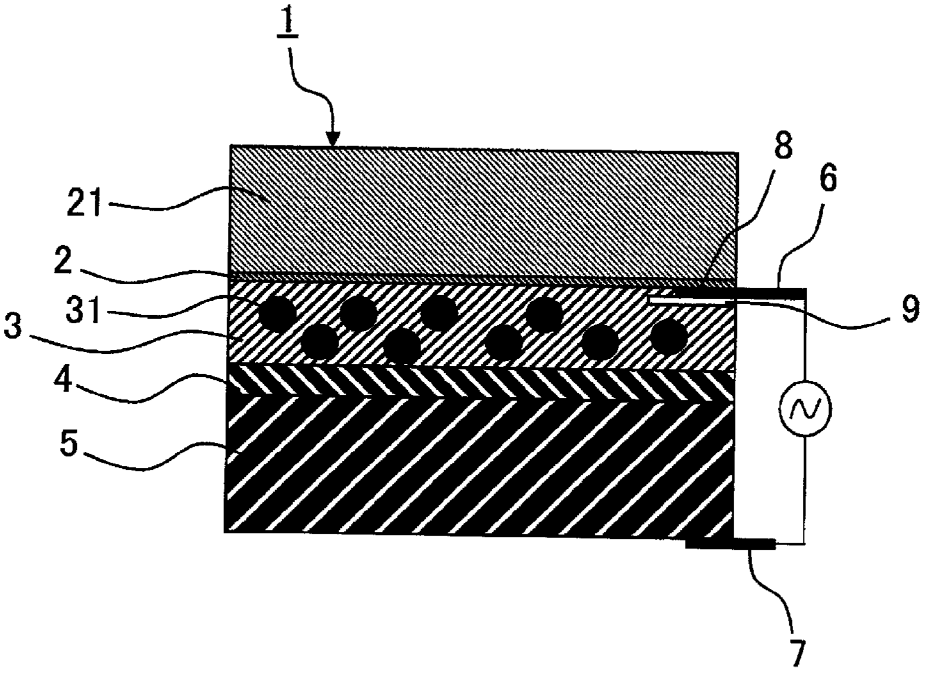
FIG. 1 is a cross sectional view of an inorganic EL device (element) that is one preferable embodiment of the present invention.

According to the present invention, there is provided the following means:

(1) An EL device, comprising:

a transparent support, a conductive layer, a phosphor layer, a reflection insulating layer, and a back electrode;

wherein the conductive layer, the phosphor layer, the reflection insulating layer and the back electrode are provided on the transparent support in this order, and wherein the conductive layer comprises silica in an amount of 0.05 g/m$^2$ or more.

(2) The EL device as described in the above item (1), wherein the content of the silica is 0.16 g/m$^2$ or more.

(3) The EL device as described in the above item (1) or (2), wherein the conductive layer comprises a first conductive layer, a second conductive layer having higher resistance than that of the first conductive layer, and a silica-containing layer containing the silica, and wherein the content of the silica in the silica-containing layer is 6% by volume or more.

(4) A light-sensitive material for forming a conductive film, comprising:

a transparent support, and a silver salt-containing emulsion layer provided on the transparent support;

wherein at least one of layers provided on the silver salt-containing emulsion layer side comprises silica in an amount of 0.05 g/m$^2$ or more.

(5) The light-sensitive material for forming a conductive film as described in the above item (4), wherein the content of the silica is 0.16 g/m$^2$ or more.

(6) The light-sensitive material for forming a conductive film as described in the above item (4) or (5), wherein an outermost layer at the silver salt-containing emulsion layer side comprises silica.

(7) The light-sensitive material for forming a conductive film as described in any one of the above items (4) to (6), wherein at least one of the silver salt-containing emulsion layer and any other layers at the silver salt-containing emulsion layer side comprises conductive fine particles and a binder.

(8) The light-sensitive material for forming a conductive film as described in any one of the above items (4) to (7), wherein the material comprises a silica-containing layer containing the silica at the silver salt-containing emulsion layer side, and wherein the content of the silica in the silica-containing layer is 6% by volume or more.

(9) A conductive film, comprising a conductive portion formed by exposing and developing a light-sensitive material for forming a conductive film;

wherein the light-sensitive material comprises a transparent support, and a silver salt-containing emulsion layer provided on the transparent support; and wherein at least one of layers provided on the silver salt-containing emulsion layer side comprises silica in an amount of 0.05 $g/m^2$ or more.

(10) The conductive film as described in the above item (9), which has haze of 20% to 50%.

In the invention, the "silver salt-containing emulsion layer side (of the support)" or the "conductive layer side" denotes a support side opposite to the back face side of the transparent support, i.e., the support side on which at least silver salt-containing emulsion layer or conductive layer is provided.

The light-sensitive material for forming a conductive film (hereinafter, also referred to as "conductive film-forming light-sensitive material") of the present invention has a silver salt-containing emulsion layer provided on a transparent support, and at least one of layers at the silver salt-containing emulsion layer side contain silica in an amount of 0.05 $g/m^2$ or more. According to this constitution of the conductive film-forming light-sensitive material of the present invention, it is possible to form a conductive film excellent in adhesion properties between the conductive film and a phosphor layer of an EL device, whereby the EL device having excellent optical properties can be produced. Though the reason why adhesion properties between the conductive film and the phosphor layer become excellent is not yet certain, it is presumed that such enhancement of adhesion properties arises from an anchor-effect caused by the contained silica (especially colloidal silica) and adhesion effect relating to the silica.

The content of the silica is preferably 0.16 $g/m^2$ or more, more preferably 0.24 $g/m^2$ or more. The content of the silica is preferably 0.5 $g/m^2$ or less, more preferably 0.4 $g/m^2$ or less. If the content of the silica is excessive, dispersion of silica may become difficult, and/or surface properties may become worse in a production process. If the content of the silica is not enough, adhesion properties between the phosphor layer and the conductive film become weak.

As for the conductive film-forming light-sensitive material of the present invention, for example, an embodiment having substantially only a silver salt-containing emulsion layer on a transparent support, and an embodiment having a silver salt-containing emulsion layer, a conductive fine particles-containing layer, and a silica-containing layer on a transparent support are considered. In the case of the embodiment having substantially only a silver salt-containing emulsion layer on a transparent support, the silica is contained in the silver salt-containing emulsion layer.

In the case of the embodiment having a silver salt-containing emulsion layer, a conductive fine particles-containing layer, and a silica-containing layer on a transparent support, the content of silica is preferably 6% by volume or more, and further preferably 15% by volume or more, based on the entire silica-containing layer. The content of silica is preferably 50% by volume or less, based on the entire silica-containing layer. Technical meanings of both upper limit value and lower limit value in terms of volumetric basis are the same as those in terms of mass standard.

As for the silica, it is preferable to use silica in a colloid (colloidal silica). The colloidal silica refers to a colloid of fine particles of silicic anhydride having an average particle size of 1 nm or more and 1 μm or less, and those described in JP-A-53-112732, JP-B-57-9051 ("JP-B" means examined Japanese patent publication) and JP-B-57-51653 can be made hereof by reference. Such colloidal silica can be prepared by a sol-gel method and used, and commercially available products can be utilized.

In the case where colloidal silica is prepared by a sol-gel method, it can be prepared by referring to, for example, Werner Stober, et al., "J. Colloid and Interface Sci.", 26, p. 62-69 (1968); Ricky D. Badley, et al., "Langmuir", 6, p. 792-801 (1990); and "Skikizai Kyokaishi (Journal of the Japan Society of Colour Material)", 61[9], p. 488-493 (1988).

In the case where a commercially available product is used as the colloidal silica, SNOWTEX-XL (trade name, average particle size: 40 to 60 nm), SNOWTEX-YL (trade name, average particle size: 50 to 80 nm), SNOWTEX-ZL (trade name, average particle size: 70 to 100 nm), PST-2 (trade name, average particle size: 210 nm), MP-3020 (trade name, average particle size: 328 nm), SNOWTEX 20 (trade name, average particle size: 10 to 20 nm, $SiO_2/Na_2O>57$), SNOWTEX 30 (trade name, average particle size: 10 to 20 nm, $SiO_2/Na_2O>50$), SNOWTEX C (trade name, average particle size: 10 to 20 nm, $SiO_2/Na_2O>100$), and SNOWTEX O (trade name, average particle size: 10 to 20 nm, $SiO_2/Na_2O>500$), all of which are manufactured by Nissan Chemical Industries, Ltd., and the like can be preferably used (the term "$SiO_2/Na_2O$" as referred to herein is a content mass ratio of silicon dioxide to sodium hydroxide as expressed by converting sodium hydroxide to $Na_2O$ and is described in a brochure). In the case where a commercially available product is utilized, SNOWTEX-YL, SNOWTEX-ZL, PST-2, MP-3020 and SNOWTEX C are especially preferable.

Though a major component of the colloidal silica is silicon dioxide, alumina, sodium aluminate or the like may be contained as a minor component; and/or an inorganic base such as sodium hydroxide, potassium hydroxide, lithium hydroxide and ammonia, and/or an organic base such as tetramethylammonium may be further contained as a stabilizer.

As the colloidal silica that can be used in the present invention, colloidal silica having a long and narrow shape of 1 to 50 nm in thickness and 10 to 1,000 nm in length as described in JP-A-10-268464; and composite particles of colloidal silica and an organic polymer as described in JP-A-9-218488 or JP-A-10-111544 can also be preferably used. As a commercial product, it is possible to use AEROSIL 200, 200V and 300 (trade names, manufactured by Nippon Aerosil Co., Ltd.), AEROSIL OX 50 and TT600 (trade names, manufactured by Degussa AG), SYLYSIA (trade name, manufactured by FUJI SILYSIA CHEMICAL LTD.), or the like. SYLYSIA manufactured by FUJI SILYSIA CHEMICAL LTD. is most preferable.

About each of the layers of the light-sensitive material for forming a conductive film of the present invention, the structure thereof will be described in detail hereinafter.

[Support]

A support to be employed for the light-sensitive material for forming a conductive film of the present invention can be, for example, a plastic film, a plastic plate or a glass plate. The thickness of the support is preferably 50 to 300 μm, more preferably 60 to 200

The support is preferably a film or plate made of a plastic having a melting point of about 290° C. or lower, such as polyethyleneterephthalate (PET) (melting point: 258° C.), polyethylenenaphthalate (PEN) (melting point: 269° C.), polyethylene (PE) (melting point: 135° C.), polypropylene (PP) (melting point: 163° C.), polystyrene (melting point: 230° C.), polyvinyl chloride (melting point: 180° C.), polyvinylidene chloride (melting point: 212° C.), or triacetyl cellulose (TAC) (melting point: 290° C.). PET is particularly preferred for the support from the viewpoint of light transmittance and workability.

The transparency of the support is preferably high. It is preferred that the above support has a transmittance in the entire visible region of 70% to 100%, more preferably 85% to 100%, and particularly preferably 90% to 100%. Further, the support may be colored to an extent not hindering the objects of the present invention.

[Silver Salt-Containing Emulsion Layer]

The light-sensitive material for forming a conductive film of the present invention has, on the support, an emulsion layer containing a silver salt as a photosensor (silver salt-containing light-sensitive layer). The silver salt-containing emulsion layer (silver salt-containing light-sensitive layer) is subjected to exposure and developing process, thereby forming a conductive layer. The silver salt-containing light-sensitive layer may contain, in addition to the silver salt and a binder, an additive such as a solvent and a dye. The silver salt-containing light-sensitive layer is subjected to exposure using a specifically shaped mesh pattern and developing process, thereby forming a first conductive layer. The first conductive layer in the present invention is a layer containing a mesh-like formed conductive portion and an opening portion other than the conductive portion. The emulsion layer may be composed of a single layer or two or more layers. The thickness of the emulsion layer is preferably 0.1 μm to 10 μm, and more preferably 0.1 μm to 5 μm.

In the light-sensitive material, the silver salt-containing emulsion layer is substantially laid as the topmost layer. The term "the silver salt-containing emulsion layer is substantially laid as the topmost layer" means not only a case where the silver salt-containing emulsion layer is actually laid as the topmost layer but also a case where a layer(s) having total film thickness of 0.5 μm or less is laid on the silver salt-containing emulsion layer. The total film thickness of the layer(s) laid on the silver salt-containing emulsion layer is preferably 0.2 μm or less.

(Silver Salt)

Examples of the silver salt used in the present invention include an inorganic-silver salt such as a silver halide, and an organic-silver salt such as silver acetate. In the present invention, it is preferable to employ a silver halide superior in a property as a photosensor, and technologies of a silver salt photographic film, a photographic paper, a lithographic film, and an emulsion mask for a photomask relating to a silver halide are applicable also in the present invention. The amount of the silver salt to be coated in the silver salt-containing emulsion layer is not particularly limited. The amount is preferably from 0.1 to 40 g/m$^2$, more preferably from 0.5 to 25 g/m$^2$, further preferably 0.5 to 10 g/m$^2$, and particularly preferably 4 to 8.5 g/m$^2$, in terms of silver.

The silver halide emulsion to be employed in the present invention may contain a metal belonging to a group VIII or VIIB of the periodic table. Particularly for attaining a high contrast and a low fog level, it is preferable to contain a rhodium compound, an iridium compound, a ruthenium compound, an iron compound, an osmium compound, or the like. Such a compound can be a compound having various ligands. Further, for attaining a high sensitivity, there is advantageously employed a doping with a hexacyano metal complex such as $K_4[Fe(CN)_6]$, $K_4[Ru(CN)_6]$, or $K_3[Cr(CN)_6]$.

The rhodium compound can be a water-soluble rhodium compound, such as a rhodium (III) halide compound, a hexachlororhodium (III) complex salt, a pentachloroaquorhodium complex salt, a tetrachlorodiaquorhodium complex salt, a hexabromorhodium (III) complex salt, a hexaamminerhodium (III) complex salt, a trisalatorhodium (III) complex salt, and $K_3[Rh_2Br_9]$.

Examples the iridium compound include a hexachloroiridium complex salt such as $K_2[IrCl_6]$ and $K_3[IrCl_6]$, a hexabromoiridium complex salt, a hexaammineiridium complex salt, and a pentachloroaquonitrosyliridium complex salt.

In production of the silver halide emulsion used in the present invention, it is preferable that washing and desalting are carried out without using an anionic precipitation agent during the production process. For the purpose that the washing and desalting are carried out according to a method in which an emulsion is precipitated only by pH adjustment in the absence of an anionic precipitation agent and a supernatant is removed, it is preferable to use a chemically modified gelatin as a dispersant. When a gelatin in which a positively charged amino group has been changed to an uncharged or negatively charged one, is used as a dispersant, it becomes possible to precipitate an emulsion only by reducing pH, which results in elimination of need for the anionic precipitation agent. Examples of the thus-modified gelatin include acetylated, deaminated, benzoylated, dinitrophenylated, trinitrophenylated, carbamylated, phenylcarbamylated, succinylated, succinated or phthalated gelatin. Among these gelatins, it is preferable to use phthalated gelatin. When the phthalated gelatin is used, improvement of conductive property and coating surface state in combination can be achieved.

(Binder)

In the emulsion layer, a binder is used to disperse the silver salt particles evenly and to aid the adhesion between the emulsion layer and the support. In the present invention, although both water-insoluble polymer and water-soluble polymer may be used as the binder, it is preferable to use a water-soluble polymer.

Examples of the binder include gelatin, polyvinyl alcohol (PVA), polyvinyl pyrrolidone (PVP), polysaccharides such as starch, cellulose and derivatives thereof, polyethylene oxide, polysaccharide, polyvinyl amine, chitosan, polylysine, polyacrylic acid, polyalginic acid, polyhyaluronic acid, and carboxycellulose. These materials have a neutral, anionic or cationic property depending on the ionic property of the functional group. As the gelatin, the above-described chemically modified gelatin may be used. In the present invention, gelatin is particularly preferably used.

The amount of the binder contained in the emulsion layer is not particularly restricted, and can be suitably selected within a range of meeting the dispersibility and the adhesion. As for the binder content in the emulsion layer, the ratio by volume of Ag to the binder is preferably 1/10 or more, more preferably 1/4 or more, further preferably 1/2. The ratio by volume of Ag to the binder is further preferably 1/2 to 10/1, most preferably 1/2 to 5/1.

(Solvent)

A solvent to be employed in forming the emulsion layer is not particularly limited, and can be, for example, water, an organic solvent (for example, alcohols such as methanol, ketones such as acetone, amides such as formamide, sulfoxides such as dimethyl sulfoxide, esters such as ethyl acetate, or ethers), an ionic liquid or a mixture thereof.

The content of the solvent to be used in the emulsion layer is in the range of preferably 30 to 90 mass %, more preferably in the range of 50 to 80 mass %, with respect to the total mass of the silver salt, the binder and the like contained in the emulsion layer.

(Other Additives)

Various additives to be employed in the present invention are not particularly limited, and any additive can be employed advantageously. Examples thereof include a thickener, an antioxidant, a matting agent, a lubricant, an antistatic agent, a nucleating agent, a spectral sensitizing dye, a surfactant, an antifog agent, a hardener, and a black-spot inhibitor. A compound having a high dielectric constant may be added. In order to make the surface hydrophobic, a hydrophobic group(s) may be introduced into the binder, or a hydrophobic compound may be added into the binder.

(Conductive Fine Particles and Binder)

In the conductive film-forming light-sensitive material of the present invention, it is preferable that at least one of the silver salt-containing emulsion layer and any other layers at the silver salt-containing emulsion layer side contains conductive fine particles and a binder. The ratio by mass of the conductive fine particles and the binder (conductive fine particles/binder ratio) is preferably from 1/33 to 5/1, and more preferably from 1/3 to 3/1.

When the layer into which the conductive fine particles are incorporated is the at least one of layers on the silver salt-containing emulsion layer side, the layer is not particularly limited in position as far as the layer satisfies the requirement that the layer has electro conductivity to a conductive layer after a conductive material is produced. Especially, it is preferable that a layer containing conductive fine particles and a binder is disposed on the silver salt-containing emulsion layer.

Examples of the conductive fine particles to be employed in the present invention include particles of metal oxide such as $SnO_2$, ZnO, $TiO_2$, $Al_2O_3$, $In_2O_3$, MgO, BaO and $MoO_3$; particles of a composite oxide thereof; and particles of a metal oxide obtained by incorporating, into such a metal oxide, a different atom. Preferred examples of the metal oxide include $SnO_2$, ZnO, $TiO_2$, $Al_2O_3$, $In_2O_3$, and MgO; and $SnO_2$ is particularly preferred. $SnO_2$ particles are preferably $SnO_2$ particles doped with antimony, in particular preferably $SnO_2$ particles doped with antimony in an amount of 0.2 to 2.0 mol %. The shape of the conductive fine particles to be employed in the present invention is not particularly limited, and examples thereof include granular and needle shapes. The particle diameter of the conductive fine particles is preferably from 0.005 to 0.12 μm. The lower limit of the particle diameter is more preferably 0.008 μm, and even more preferably 0.01 μm. The upper limit of the particle diameter is 0.08 μm, and even more preferably 0.05 μm. When the requirement for the particle diameter is satisfied, there can be formed a conductive layer excellent in transparency and even in conductivity in the in-plane direction.

The lower limit of the powder resistivity of (a 9.8-MPa green compact of) the conductive fine particles is preferably 0.8 Ωcm, more preferably 1 Ωcm, and even more preferably 4 Ωcm. The upper limit of the powder resistivity of (a 9.8-MPa green compact of) the conductive fine particles is preferably 35 Ωcm, more preferably 20 Ωcm, and even more preferably 10 Ωcm. When the requirement for the powder resistivity is satisfied, a conductive layer even in conductivity in the in-plane direction can be formed.

The specific surface area (according to a simple BET method) is preferably from 60 to 120 $m^2$/g, more preferably from 70 to 100 $m^2$/g. Conductive fine particles satisfying all of the above-mentioned preferred requirements are particularly preferred.

When the conductive fine particles are spherical particles, the average (primary) particle diameter is preferably from 0.005 to 0.12 μm, more preferably 0.008 to 0.05 μm, and further preferable 0.01 to 0.03 μm. The powder resistivity is preferably from 0.8 to 7 Ωcm, and more preferably from 1 to 5 Ωcm.

When the particles are needle-form particles, the average axial length of their long axes is preferably from 0.2 to 20 μm and that of their short axes is from 0.01 to 0.02 μm. The powder resistivity thereof is preferably from 3 to 35 Ωcm, and more preferably from 5 to 30 Ωcm.

When the conductive fine particles and the binder are incorporated into the silver salt-containing emulsion layer, the coating amount of the conductive fine particles is preferably from 0.05 to 0.9 g/$m^2$, more preferably from 0.1 to 0.6 g/$m^2$, even more preferably from 0.1 to 0.5 g/$m^2$, and in particular preferably from 0.2 to 0.4 g/$m^2$.

When a layer containing the conductive fine particles and the binder (for example, as an upper layer) is provided in addition to the silver-salt-containing emulsion layer, the coating amount of the conductive fine particles is preferably from 0.1 to 0.6 g/$m^2$, more preferably from 0.1 to 0.5 g/$m^2$, and even more preferably from 0.2 to 0.4 g/$m^2$.

When the conductive fine particles and the binder are incorporated into a lower layer (such as an undercoating film), which is under the silver salt-containing emulsion layer, the coating amount of the conductive fine particles is preferably from 0.1 to 0.6 g/$m^2$, more preferably from 0.1 to 0.5 g/$m^2$, and even more preferably from 0.16 to 0.4 g/$m^2$.

If the coating amount of the conductive fine particles is too large, the transparency becomes insufficient for practical use. Thus, the resultant conductive film tends to be unsuitable for a transparent conductive film. Furthermore, if the coating amount of the conductive fine particles is too large, the conductive fine particles are not easily dispersed into an even state in the step of coating the particles. Thus, production failures tend to increase. If the coating amount is too small, the in-plane electric characteristics become insufficient. Thus, when the resultant film is used for an EL element or the like, the luminance tends to become insufficient for practical use.

The binder is additionally used for the conductive fine particle-containing layer in order to cause the conductive fine particles closely to adhere onto the support. As such a binder, a water-soluble polymer is preferably used. As the binder, for example, it is possible to use the same binder as those used in the emulsion layer. In the present invention, it is allowable to lay an optional layer other than the silver-salt-containing emulsion layer, and incorporate the conductive fine particles and the binder into the optional layer. The optional layer may be an upper layer or lower layer, which is over or under the silver-salt-containing emulsion layer, respectively. It is also preferred to incorporate the conductive fine particles and the binder into a layer adjacent to the silver-salt-containing emulsion layer. Herein, the term “upper layer” means a layer which is nearer to the topmost surface layer (or the topmost layer), which is farther from the transparent support than the emulsion layer, and any “lower layer” means a layer nearer to the transparent support than the emulsion layer.

[Other Layer Structures]

In the present invention, a protective layer may be formed on the emulsion layer. In the present invention, the “protective layer” means a layer made from a binder such as gelatin and a polymer, and is formed on the emulsion layer having photosensitivity, for the purposes of preventing scratches and improving mechanical characteristics. The thickness of the protective layer is preferably 0.2 μm or less. A coating method and a forming method of the protective layer are not particularly limited, and an ordinary coating method and forming method can be appropriately selected. Below the silver halide-containing emulsion layer, for example, an undercoating layer may be laid.

<Matting Agent-Containing Layer>

It is preferable that a matting agent-containing layer is disposed on the surface of the support at the side opposite to the side of the emulsion layer. Occurrence of fog is suppressed and pressure properties can be improved by disposing the matting agent-containing layer. Though the addition amount of the matting agent is preferably in the range of 5 to 1,000 mg/m$^2$, and more preferably in the range of 100 to 700 mg/m$^2$, the addition amount can be properly chosen depending upon the kind of the matting agent or the like. Examples of the matting agent include organic compound particles such as acrylic particles, cross-linked acrylic particles, polystyrene particles, cross-linked styrene particles, melamine particles, and benzoguanamine particles. Among these compounds, PMMA (poly(methyl methacrylate)) particles are especially preferable. Examples thereof include compounds described in page 19, left upper column, line 15 to page 19, right upper column, line 15 of JP-A-2-103536.

<Anti-Curing Layer>

It is preferable that an anti-curing layer is disposed on the surface of the support at the side opposite to the side of the emulsion layer. Curing of the support caused by annealing treatment or the like can be prevented by disposing the anti-curing layer. The anti-curing layer may be provided, for example, by applying a binder such as gelatin as an undercoat layer, or by successively coating a binder such as gelatin as an undercoat layer containing a matting agent. Examples of the binder in the anti-curing layer may be the same as those used in the emulsion layer. The coating amount of the binder is preferably from 5 to 2,000 mg/m$^2$, and more preferably from 100 to 1,500 mg/m$^2$. The coating amount may be adjusted depending on the degree of occurrence of curling.

[Conductive Film]

The conductive film used in the present invention has a conductive layer provided on the transparent support, the conductive layer containing silica in an amount of 0.05 g/m$^2$ or more. It is preferable that the content of the silica is 0.16 g/m$^2$ or more, and further preferably 0.24 g/m$^2$ or more. It is preferable that the content of the silica is 0.5 g/m$^2$ or less, and further preferably 0.4 g/m$^2$ or less. If the content of the silica is excessive, dispersion of silica may become difficult, or surface properties may become worse in a production process. If the content of the silica is not enough, adhesion properties between the phosphor layer and the conductive film become weak. The conductive film used in the present invention is preferably obtained by subjecting the aforementioned conductive film-forming light-sensitive material to pattern exposure and developing process. However, the conductive film is not restricted to this product.

With respect to the conductive film used in the present invention, when the conductive layer and/or at least one of layers at the conductive layer side contain conductive fine particles and a binder, examples of the conductive film (first conductive film) include a conductive film obtained by subjecting the aforementioned conductive film-forming light-sensitive material to pattern exposure and developing process, a layer having a copper foil mesh pattern, and a layer having a mesh pattern formed by a printing method. In addition to the first conductive film and the second conductive film (the at least one of layers at the conductive layer side containing conductive fine particles and a binder, for example, the protective layer and the undercoat layer), further a layer containing conductive fine particles different from the conductive fine particles contained in the second conductive film, an ITO layer and/or a conductive polymer-containing layer may be disposed.

The first conductive layer and the second conductive layer in the conductive film of the present invention preferably satisfy relationships described below. When the relationships are satisfied, the in-plane electric characteristics of the conductive film become evener. Thus, when the film is made into an inorganic EL device, a sufficient luminance can be obtained in the whole of its plane.

(1) The surface resistivity of the first conductive layer is smaller than that of the second conductive layer.

(2) The surface resistivity of the first conductive layer is 1,000 Ω/sq or less (and 0.01 Ω/sq or more), and that of the second conductive layer is $1\times10^3$ Ω/sq or more (and $1\times10^{14}$ Ω/sq or less).

The upper limit of the surface resistivity of the first conductive layer is more preferably 150 Ω/sq. The lower limit of the surface resistivity of the first conductive layer is more preferably 0.1 Ω/sq, and particularly preferably 1 Ω/sq.

The upper limit of the surface resistivity of the second conductive layer (conductive fine particle-containing layer) is more preferably $1\times10^{13}$ Ω/sq. The lower limit of the surface resistivity of the second conductive layer is more preferably $1\times10^5$ Ω/sq, and particularly preferably $1\times10^6$ Ω/sq.

In the present invention, the surface resistivity may be measured with resistivity meter for low resistivity Loresta GP (trade name, manufactured by Mitsubishi Chemical Corporation), NON-CONTACT CONDUCTANCE MONITOR MODEL 717B (trade name, manufactured by DELCOM Instruments, Inc.), or a digital ultra high resistance/microammeter 8340A (trade name, manufactured by ADC Corporation).

The conductive film of the present invention has a haze of preferably 20% to 50%. The haze can be measured using, for example, a haze meter manufactured by Tokyo Denshoku Industries Co., Ltd.

The following will describe, in detail, embodiments of the conductive film obtained by exposing the light-sensitive material for forming a conductive film of the present invention patternwise to light, and then subjecting the exposed material to developing treatment.

In the present invention, examples of the mesh patterns that are formed by pattern exposure and developing process include a rectilinear grid pattern having a mesh-like form in which lines are nearly orthogonal, and a wavy line grid pattern in which a conductive portion between crossings has at least one curvature. In the present invention, the pitch of mesh pattern of the conductive layer (the total of a line width of the conductive portion and a width of the opening portion) is preferably 300 μm or more. The pitch is preferably 5,000 μm or less, more preferably 600 μm or less. For example, as for the rectilinear grid pattern, it is preferable that the ratio of line width of the conductive portion/width of opening portion, namely line/space is from 5/4995 to 10/295.

[Exposure]

A pattern-exposure of the silver halide-containing emulsion layer can be performed by a planar exposure using a photomask, or by a scanning-exposure with a laser beam. A refractive exposure employing a lens or a reflective exposure employing a reflecting mirror may be employed, and a contact exposure, a proximity exposure, a reduced projection exposure or a reflective projection exposure may be used.

[Developing Treatment]

After light-exposure is performed on the silver halide-containing layer, the light-sensitive material of the present invention is further subjected to a developing process. As for the developing process, it is possible to use an ordinary developing process technique that is used for a silver salt photographic film, a photographic paper, lithographic films, emulsion masks for photomask, or the like.

In the present invention, the aforementioned pattern-exposure and developing process are conducted, whereby a conductive portion (metal silver portion) having a mesh pattern is formed in the exposed portion, and also an opening portion (light-transmitting portion) is formed in the unexposed portion.

The developing process for the light-sensitive material of the present invention may include a fixing process conducted to remove the silver salt in the unexposed portion and attain stabilization. In the fixing process for the light-sensitive material of the present invention, there may be used any technique of the fixing process used for silver salt photographic films, photographic paper, lithographic films, emulsion masks for photomasks, and the like.

In the case where the silver-salt-containing emulsion layer contains the conductive fine particles, with respect to the thus-obtained conductive film, the conductive fine particles are dispersed in a light transmissible region, from which the silver salt has dropped out, so that a conductive layer having a higher resistivity than the metal silver region is formed. When any layer other than the silver-salt-containing emulsion layer contains conductive fine particles, a conductive layer having a light transmissible region wherein the conductive fine particles are dispersed is formed in the same manner. The conductive film is preferably used for a transparent electrode of an inorganic EL device.

For the above-mentioned light-sensitive material, conductive film and inorganic EL device of the present invention, any appropriate combination of two or more selected from known documents listed up below may be used.

JP-A-2004-221564, JP-A-2004-221565, JP-A-2007-200922, JPA-2006-352073, WO 2006/001461 A1, JP-A-2007-129205, JP-A-2007-235115, JPA-2007-207987, JP-A-2006-012935, JP-A-2006-010795, JP-A-2006-228469, JP-A-2006-332459, JP-A-2007-207987, JP-A-2007-226215, WO 2006/088059 A1, JPA-2006-261315, JP-A-2007-072171, JP-A-2007-102200, JP-A-2006-228473, JPA-2006-269795, JP-A-2006-267635, JP-A-2006-267627, WO 2006/098333, JP-A-2006-324203, JP-A-2006-228478, JP-A-2006-228836, JP-A-2006-228480, WO 2006/098336 A1, WO 2006/098338 A1, JP-A-2007-009326, JP-A-2006-336057, JP-A-2006-339287, JP-A-2006-336090, JP-A-2006-336099, JP-A-2007-039738, JP-A-2007-039739, JP-A-2007-039740, JP-A-2007-002296, JP-A-2007-084886, JP-A-2007-092146, JPA-2007-162118, JP-A-2007-200872, JP-A-2007-197809, JP-A-2007-270353, JPA-2007-308761, JP-A-2006-286410, JP-A-2006-283133, JP-A-2006-283137, JP-A-2006-348351, JP-A-2007-270321, JP-A-2007-270322, WO 2006/098335 A1, JPA-2007-088218, JP-A-2007-201378, JP-A-2007-335729, WO 2006/098334 A1, JPA-2007-134439, JP-A-2007-149760, JP-A-2007-208133, JP-A-2007-178915, JPA-2007-334325, JP-A-2007-310091, JP-A-2007-311646, JP-A-2007-013130, JPA-2006-339526, JP-A-2007-116137, JP-A-2007-088219, JP-A-2007-207883, JPA-2007-207893, JP-A-2007-207910, JP-A-2007-013130, WO 2007/001008, JP-A-2005-302508, JP-A-2005-197234, JP-A-2008-218784, JP-A-2008-227350, JP-A-2008-227351, JP-A-2008-244067, JP-A-2008-267814, JP-A-2008-270405, JP-A-2008-277675, JP-A-2008-277676, JP-A-2008-282840, JP-A-2008-283029, JP-A-2008-288305, JPA-2008-288419, JP-A-2008-300720, JP-A-2008-300721, JP-A-2009-4213, JP-A-2009-10001, JP-A-2009-16526, JP-A-2009-21334, JP-A-2009-26933, JP-A-2008-147507, JP-A-2008-159770, JP-A-2008-159771, JP-A-2008-171568, JP-A-2008-198388, JP-A-2008-218096, JP-A-2008-218264, JP-A-2008-224916, JP-A-2008-235224, JPA-2008-235467, JP-A-2008-241987, JP-A-2008-251274, JP-A-2008-251275, JPA-2008-252046, JP-A-2008-277428, and JP-A-2009-21153.

<EL Device>

The EL device of the present invention is described in detail below.

The EL device of the present invention has a construction in which a phosphor layer is sandwiched between a pair of opposed electrodes, and at least one of the electrodes has the above-described conductive film. The EL device of the present invention has the conductive film (conductive layer) containing silica in an amount of 0.05 g/m$^2$ or more, whereby the EL device having excellent adhesion properties between the phosphor layer and the conductive film and excellent optical properties is achieved. Though the reason why adhesion properties between the phosphor layer and the conductive film become excellent is not yet certain, it is presumed that such enhancement of adhesion properties arises from an anchor-effect caused by colloidal silica and adhesion effect relating to the silica. The EL device may be an organic EL device, or an inorganic EL device.

FIG. 1 shows a sectional view of a preferred embodiment of the inorganic EL device of the present invention. The inorganic EL device 1 that is one preferable embodiment of the present invention has, in the following order, a transparent electrode (the above-described conductive film) 2, a phosphor layer 3, a reflection insulating layer 4 and a back electrode 5. The phosphor layer 3 is disposed at a conductive layer side of the conductive film. The transparent electrode 2 and the back electrode 5 are electrically connected to each other through electrodes 6 and 7. A silver paste 8 is applied as a supplemental electrode on the electrode 6 containing with the transparent electrode 2, and an insulating paste 9 is applied at the side of the phosphor layer 3.

The phosphor layer 3, the reflection insulating layer 4 and the back electrode 5 may be provided by printing these layers on the transparent electrode, or alternatively a device may be formed by sticking these layers. Herein the expression "provided by printing" means directly printing the phosphor layer 3, the reflection insulating layer 4 and the back electrode 5 on the transparent electrode so that these layers are provided on the transparent electrode. Further, the expression "sticking" means forming a device by thermal compression bond of the transparent electrode and an integrated member of the phosphor layer 3, the reflection insulating layer 4 and the back electrode 5. Especially, the above-described "sticking" type device is preferable because it is considered that enhancement of adhesion properties arises from an anchor-effect caused by colloidal silica and adhesion effect relating to the silica.

An electric potential difference is applied to phosphor 31 in the phosphor layer 3 by applying voltage to the transparent electrode 2 and the back electrode 5. The electric potential difference becomes emission energy, and a light-emitting state is maintained by continuing to apply the electric potential difference using an AC source.

[Transparent Electrode]

Figure 2:
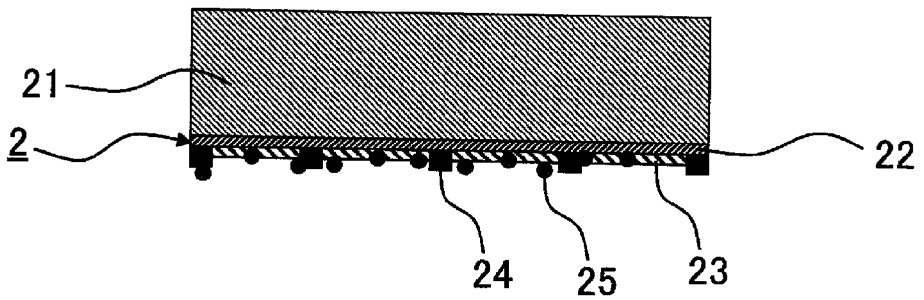
FIG. 2 is an enlarged cross sectional view of a conductive film (transparent electrode) of the inorganic EL device shown in FIG. 1.

The above-described transparent conductive film is used as the transparent electrode 2 used in the present invention. An enlarged cross sectional view of a conductive film (transparent electrode) of the inorganic EL device shown in FIG. 1 is shown in FIG. 2. In FIG. 2, the conductive film 2 has, on a transparent support 21, an undercoat layer (Gel layer) 22, a conductive fine particle-containing layer (tin oxide layer) 23, and a silver mesh patterned conductive layer 24. Further, colloidal silica particles 25 are formed in the tin oxide layer 23 and/or the conductive layer 24. As mentioned above, adhesion properties between the conductive film 2 and the phosphor layer 3 are improved by incorporating the predetermined amount of silica in the conductive film 2.

[Phosphor Layer]

The phosphor layer (phosphor particle layer) 3 is formed by dispersing phosphor particles 31 in a binder. Example of the binder that can be used include polymers having a comparatively high permittivity, such as cyanoethyl cellulose-series resins, and resins such as polyethylene, polypropylene, polystyrene-series resins, silicone resins, epoxy resins and vinylidene fluoride resins. The thickness of the phosphor layer 3 is preferably from 1 μm to 50 μm.

The phosphor particles 31 contained in the phosphor layer 3 are, specifically, particles of a semiconductor comprising one or more elements selected from the group consisting of the Group II elements and the Group VI elements and one or more elements selected from the group consisting of the Group III elements and the Group V elements. These elements are selected according to the necessary luminescence wavelength region. As the particles, ZnS, CdS and CaS are preferably used.

The average sphere-equivalent diameter of the phosphor particles 31 is preferably from 0.1 μm to 15 μm. The variation coefficient of the average sphere-equivalent diameter is preferably 35% or less, and further preferably from 5% to 25%. The average sphere-equivalent diameter of these particles can be measured, for example, using LA-500 (trade name, manufactured by HORIBA Ltd.) according to a laser light scattering method, or using a coulter counter manufactured by Beckman Coulter Inc.

[Reflection Insulating Layer]

It is preferable that the inorganic EL device 1 of the present invention has a reflection insulating layer 4 (in some cases, also referred to as a dielectric layer) close to both the phosphor layer 3 and the back electrode 5, and disposed between these layers.

In the dielectric layer 4, any dielectric substances may be used, so long as the substance has high dielectric constant and high insulation properties, and also high dielectric breakdown voltage. These substances are selected from metal oxides, and nitrides. For example, $BaTiO_3$, $BaTa_2O_6$, or the like may be used. The dielectric layer 4 containing a dielectric substance may be disposed at one side of the phosphor particle layer 3. The dielectric layer 4 is also preferably disposed at both sides of the phosphor particle layer 3.

It is preferable that film formation of the phosphor layer 3 and the dielectric layer 4 is carried out, for example, by coating these layers in accordance with, for example, a spin coating method, a dip coating method, a bar coating method, or a spray coating method, or by screen-printing them.

[Back Electrode]

In the back electrode 5 from which light is not taken out, any conductive substances may be used. For example, a transparent electrode such as ITO, or an aluminum/carbon electrode may be used, so long as the substance is conductive. Further, the aforementioned conductive film may be used as the back electrode.

[Sealing/Water Absorption]

It is preferable that the EL device of the present invention has a proper sealing material on the opposite side of the transparent conductive film. It is also preferable that the EL device is processed so that the device can be insulated from influences of moisture and oxygen from the outside environment. When the support itself of the device has sufficient shielding properties, a moisture and oxygen-shielding sheet is covered above the produced device, and then the periphery of the device can be sealed with a curable material such as epoxy resins. Further, a shielding sheet (water-proof sheet) may be provided on both surfaces of the device in order to prevent from curing. When the support of the device is water-permeable, it is necessary that the shielding sheet be provided on both surfaces of the device.

[Voltage and Frequency]

Ordinarily, a dispersion type EL device is driven on AC. Typically, the device is driven using an AC source ranging from 50 Hz to 400 Hz at 100 V.

The EL device of the present invention has excellent adhesion properties between the phosphor layer and the conductive film. When the adhesion properties are insufficient, the air or the like becomes able to penetrate into the gap between the phosphor layer and the conductive film more easily during cutting in preparation of a sample, or during handling of the device, which results in causing a black-dot. In the EL device of the present invention, such problems are not caused. Therefore, the EL device of the present invention has excellent optical properties. For example, luminance may be improved as the time lapses According to the present invention, it is possible to provide an EL device having excellent adhesion properties between the phosphor layer and the conductive film, and also to provide a light-sensitive material for forming the conductive film.

When the light-sensitive material for forming a conductive film of the invention is used, a conductive film having a high conductivity can be produced at low cost, without being subjected to any plating treatment, by exposing the material pattern-wise to light and then subjecting the exposed material to developing treatment. In particular, a conductive material having a high conductivity and transparency can be produced at low cost.

The EL device produced by using the light-sensitive material for forming a conductive film of the present invention has excellent adhesion properties between the phosphor layer and the conductive film, and further has excellent optical properties.

The present invention will be described in more detail based on the following examples, but the invention is not intended to be limited thereto.

EXAMPLES

Example 1

| (Preparation of Emulsion A) | |
|---|---|
| **Solution 1:** | |
| Water | 750 ml |
| Gelatin (phthalation-treated gelatin) | 20 g |
| Sodium chloride | 3 g |
| 1,3-Dimethylimidazolidine-2-thione | 20 mg |
| Sodium benzenethiosulfonate | 10 mg |
| Citric acid | 0.7 g |
| **Solution 2:** | |
| Water | 300 ml |
| Silver nitrate | 150 g |

-continued

| (Preparation of Emulsion A) | |
|---|---|
| Solution 3: | |
| Water | 300 ml |
| Sodium chloride | 38 g |
| Potassium bromide | 32 g |
| Potassium hexachloroiridate (III) (0.005% in 20% aqueous KCl solution) | 5 ml |
| Ammonium hexachlororhodate (0.001% in 20% aqueous NaCl solution) | 7 ml |

The potassium hexachloroiridate (III) (0.005% in 20% aqueous KCl solution) and ammonium hexachlororhodate (0.001% in 20% aqueous NaCl solution) used in Solution 3 were prepared by dissolving complex powders thereof in a 20% aqueous solution of KCl and a 20% aqueous solution of NaCl, respectively, and heating the solutions at 40° C. for 120 minutes.

To solution 1, while the temperature and the pH of which were kept at 38° C., pH 4.5, solutions 2 and 3 (in amounts corresponding to 90% of the respective solution amounts) were added simultaneously over a period of 20 minutes with being stirred. In this way, nucleus particles of 0.16 μm in size were formed. Subsequently, the following solutions 4 and 5 were added thereto over a period of 8 minutes, and the rests of the solutions 2 and 3 (in amounts corresponding to 10% of the respective solution amounts) were further added thereto over a period of 2 minutes so as to cause the particles to grow up to 0.21 μm in size. Furthermore, 0.15 g of potassium iodide was added thereto, and the resultant was aged for 5 minutes to end the formation of the particles.

| Solution 4: | |
|---|---|
| Water | 100 ml |
| Silver nitrate | 50 g |
| Solution 5: | |
| Water | 100 ml |
| Sodium chloride | 13 g |
| Potassium bromide | 11 g |
| Potassium ferrocyanide | 5 mg |

Thereafter, washing with water by the flocculation method according to an ordinary method was conducted. Specifically, the temperature was lowered to 35° C., and the pH was lowered using sulfuric acid until the silver halide precipitated (the pH was in the range of 3.6±0.2).

About 3 L of the supernatant was then removed (first water washing). Further, after adding 3 L of distilled water, sulfuric acid was added until silver halide precipitated. Again, 3 L of the supernatant was removed (second water washing). The procedure same as the second water washing was repeated once more (third water washing), and water-washing and desalting steps were thus completed.

To the emulsion subjected to the washing and desalting, 30 g of gelatin was added, and then pH and pAg were adjusted to 5.6 and 7.5, respectively. Thereto, 10 mg of sodium benzenethiosulfonate, 3 mg of sodium benzenethiosulfinate, 15 mg of sodium thiosulfate, and 10 mg of chloroauric acid were added, and the mixture was thus subjected to chemical sensitization to obtain the optimal sensitivity at 55° C. Then, 100 mg of 1,3,3a,7-tetrazaindene as a stabilizing agent, and 100 mg of Proxel (trade name, manufactured by ICI Co., Ltd.) as an antiseptic were added. Finally, a silver iodochlorobromide cubic particle emulsion containing 70 mol % of silver chloride and 0.08 mol % of silver iodide and having an average particle diameter of 0.22 μm and a coefficient of variation of 9% was obtained. The emulsion had finally a pH of 5.7, a pAg of 7.5, an electrical conductivity of 40 μS/m, a density of $1.2\times10^3$ kg/m$^3$, and a viscosity of 60 mPa·s.

(Preparation of Emulsion Layer-Coating Liquid A)

To the above-described Emulsion A, $5.7\times10^{-4}$ mol/molAg of a sensitizing dye (SD-1) was added so as to carry out spectral sensitization. Furthermore, $3.4\times10^{-4}$ mol/molAg of KBr and $8.0\times10^{-4}$ mol/molAg of Compound (Cpd-3) were added thereto and sufficiently mixed.

Subsequently, $1.2\times10^{-4}$ mol/molAg of 1,3,3a,7-tetrazaindene, $1.2\times10^{-2}$ mol/molAg of hydroquinone, $3.0\times10^{-4}$ mol/molAg of citric acid, 90 mg/m$^2$ of sodium 2,4-dichloro-6-hydroxy-1,3,5-triazine, 15% by mass relative to the gelatin of colloidal silica having a particle size of 10 μm, 50 mg/m$^2$ of aqueous latex (aqL-6), 100 mg/m$^2$ of a polyethylacrylate latex, 100 mg/m$^2$ of a latex copolymer of methyl acrylate, sodium 2-acrylamide-2-methylpropanesulfonate and 2-acetoxyethyl methacrylate (ratio by mass 88:5:7), 100 mg/m$^2$ of a core-shell type latex (core: styrene/butadiene copolymer (ratio by mass 37/63), shell: styrene/2-acetoxyethyl acrylate (ratio by mass 84/16), core/shell ratio=50/50), and Compound (Cpd-7) (4% by mass of relative to the gelatin) were added to the mixture, to obtain an emulsion layer-coating liquid A. The pH of the coating liquid A so obtained was adjusted to 5.6 using citric acid.

SD-1

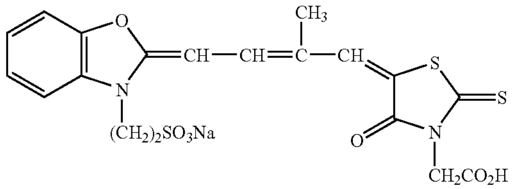

Cpd-3

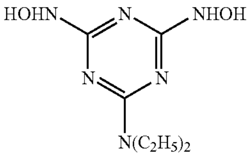

aqL-6

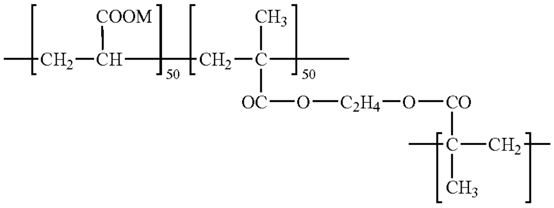

M = H or Na

Cpd-7

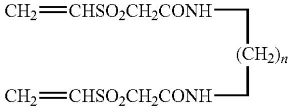

(n = 2): (n = 3) = 3:1

(Production of Inorganic EL Device Sample 1)

On a polyethyleneterephtharate film support, both surfaces thereof having been provided with a moisture barrier undercoat layer (underlayer) containing vinylidene chloride, a silver halide emulsion layer, a conductive fine particle layer and an adhesion-providing layer were coated in this order, whereby an inorganic EL device sample 1 was produced.

<Silver Halide Emulsion Layer>

The emulsion layer-coating liquid A thus prepared was coated on the undercoating layer to set the coating amounts of Ag and gelatin to 7.6 g/m$^2$ and 0.94 g/m$^2$, respectively.

<Conductive Fine Particle Layer>

The conductive fine particle layer was formed by coating the following Solution 6 in an amount of 10 ml/m$^2$ onto the above silver halide emulsion layer.

| Solution 6: | |
|---|---|
| Water | 1,000 ml |
| Gelatin | 20 g |
| Sb-doped tin oxide (trade name: SN100P, manufactured by Ishihara Sangyo Kaisha, Ltd.) | 40 g |

The Sb-doped tin oxide is spherical conductive fine particles. An average particle size of the fine particles was in the range of 0.01 to 0.03 μm (primary particle size). A powder resistance was in the range of 1 to 5 Ωcm. A specific surface area (simple BET method) was in the range of from 70 to 80 m$^2$/g. Further, a surfactant, an antiseptic agent, and a pH-adjusting agent were appropriately added.

<Silica-Containing Layer (Adhesion-Providing Layer)>

The following Solution 7 was coated in an amount of 10 ml/m$^2$ on the aforementioned silver halide emulsion layer and conductive fine particle layer, whereby the adhesion-providing layer was applied thereon.

| Solution 7: | |
|---|---|
| Water | 992 ml |
| Colloidal silica (SYLYSIA (trade name), manufactured by FUJI SILYSIA CHEMICAL LTD.) | 8 g |

Furthermore, a surfactant, a preservative, and a pH adjustor were appropriately added thereto.

The thus-obtained coating product was dried. The resultant was named Sample 1.

In Sample 1, the conductive fine particles were contained in the conductive fine particle layer in an mount of 0.4 g/m$^2$ and at a ratio by mass of the conductive fine particles to the binder of 2/1. In Sample 1, colloidal silica was also coated in an amount of 0.08 g/m$^2$. In order to examine the resistivity of the conductive fine particles alone (the conductive film resistivity), this coating sample 1 was subjected only to fixing treatment without being subjected to exposing/developing treatment. Thereafter, the surface resistivity excluding that of the silver halide was measured. As a result, it was $1\times10^{10}\Omega/\square$. The surface resistivity (unit: $\Omega/\square$) was measured with a digital ultra high resistance/microammeter 8340A (trade name, manufactured by ADC Corporation).

In Sample 1, the Ag/binder ratio was 1.0/1 which was in a preferable range of Ag/binder ratio.

(Production of Inorganic EL Device Samples 2 to 7)

Inorganic EL device samples 2 to 6 were produced in the same manner as the inorganic EL device sample 1, except that the silica content of the aforementioned Solution 7 used for the adhesion-providing layer was changed as shown in Table 1.

Further, Sample 7 using ITO was produced as a reference example. The used ITO is a product manufactured by Kitagawa Industries Co., Ltd., having transmittance of 85% and haze of 1%.

(Exposure and Developing Process)

Next, Samples 1 to 7 prepared in the above were each exposed to parallel light from a high-pressure mercury lamp as a light source through a lattice-form photomask capable of giving a developed silver image wherein lines and spaces were 5 μm and 595 μm, respectively (a photomask wherein lines and spaces were 595 μm and 5 μm (pitch: 600 μm), respectively, and the spaces were in a lattice form). The resultant was developed with the following developing solution, subjected further to developing treatment by use of a fixing solution (trade name: N3X-R for CN16X, manufactured by FUJIFILM Corporation), and rinsed with pure water. In this way, Samples were obtained.

[Composition of Developing Solution]

1 liter of the developing solution contained the following compounds:

| | |
|---|---|
| Hydroquinone | 0.037 mol/L |
| N-Methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

(Preparation of Electroluminescent Elements)

Samples 1 to 7 produced as described above were each integrated into a dispersive inorganic EL (electroluminescent) element to make a light emission test as described below.

The EL device was produced according to the following method. A reflection insulating layer containing pigments having an average particle size of 0.03 μm and a phosphor layer containing phosphor particles having an average particle size of 50 to 60 μm were provided on an aluminum sheet which was to be a back electrode, and then a hot wind drier was used to dry the whole at 110° C. for 1 hour.

Then, each of the above-described samples 1 to 7 which was to be a transparent electrode was subjected to an anneal treatment at 110° C. for 1 hour. The thus-treated samples were each superimposed on the above-described phosphor layer provided on the back electrode, and then subjected to a thermal compression bond, whereby the EL device was formed. The thermal compression bond was performed under the conditions of 180° C. and 0.5 MPa.

The device was sandwiched between two water-absorbent sheets made of nylon and two moisture-proof films. The integrated members were thermally compressed at a temperature of about 160° C. The EL device was 3 cm×5 cm in size.

(Evaluation)

The power source used to measure the light-emitting luminance was a constant-frequency constant-voltage power source CVFT-D series (trade name, manufactured by Tokyo Seiden Co., Ltd.). For the measurement of the luminance, luminance meter BM-9 (trade name, manufactured by Topcon Technohouse Corp.) was used at a condition of 100 V and 400 Hz.

Further, the transparent electrode of each sample was measured in terms of haze, adhesion properties and transmittance.

Both haze and transmittance were measured using a haze meter manufactured by TOKYO DENSHOKU Co., Ltd.

For measurement of the adhesion properties (adhesion force), a stripping test was conducted using a force gauge stand manufactured by DINEC-SHIMPO CORPORATION, and a force for stripping was measured.

The results are shown in Table 1. Further, the measurement result of adhesion force is shown in FIG. 3.

TABLE 1

| Sample No. | Silica content ($g/m^2$) | Silica content (vol %) | Haze (%) | Transmittance (%) | Adhesion properties (N) | Luminance ($cd/m^2$) | Remarks |
|---|---|---|---|---|---|---|---|
| 1 | 0.08 | 7 | 20 | 85 | 86 | 85.1 | This invention |
| 2 | 0.16 | 15 | 23 | 85 | 134 | 85.1 | This invention |
| 3 | 0.24 | 23 | 25 | 85 | 250 | 84.9 | This invention |
| 4 | 0.32 | 30 | 27 | 85 | 403 | 85.2 | This invention |
| 5 | 0 | 0 | 7 | 85 | 36 | 85 | Comparative example |
| 6 | 0.04 | 3.5 | 15 | 85 | 30 | 84.2 | Comparative example |
| 7 | — | — | 1 | 85 | 120 | 84.9 | Reference example |

Figure 3:
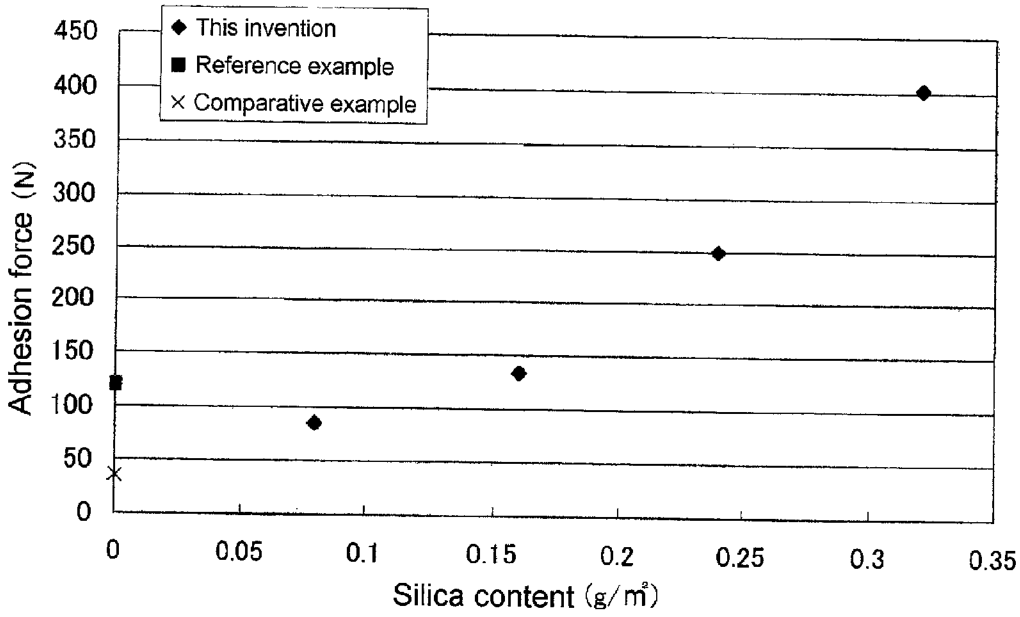
FIG. 3 is a graph showing measurement results of adhesion strength in EXAMPLE.

As shown in the results of Table 1 and FIG. 3, it is understood that both the sample 5 of the comparative example containing no silica and the sample 6 of the comparative example containing silica in an amount of less than 0.05 $g/m^2$ each had weak adhesion force. In contrast, the samples 1 to 4 of the present invention each containing silica in an amount of 0.05 $g/m^2$ or more each had excellent adhesion force. In particular, it is understood that the more the content of silica increased, the more the adhesion force was enhanced. When the content of silica was 0.16 $g/m^2$, the adhesion force became equal to or higher than that of the sample 7 of the reference example using ITO.

Further, it is understood that though the haze of the film itself in each of samples 1 to 4 of the present invention was higher than those of samples 5 to 7, the luminance in each of samples 1 to 4 of the present invention is unexpectedly equal to those of samples 5 to 7.

Further, using the same samples as above, evaluation was conducted by folding back the sample at right angle, followed by light emitting. When the adhesion properties between the phosphor layer and the transparent electrode of the EL device are weak, black-dot defects arising from voids are caused. Therefore, occurrence of the black-dot defects was visually evaluated. The results are shown in Table 2. In Table 2, when the number of black-dot defects on the device of 3 cm×5 cm was 0, the result is expressed as “A”; when the number of black-dot defects was 1 to 5, the result is expressed as “B”; and when the number of black-dot defects was more than 5, the result is expressed as “C”.

TABLE 2

| Sample No. | Silica content ($g/m^2$) | Silica content (volume %) | Black-dot defects | Remarks |
|---|---|---|---|---|
| 1 | 0.08 | 7 | B | This invention |
| 2 | 0.16 | 15 | A | This invention |
| 3 | 0.24 | 23 | A | This invention |
| 4 | 0.32 | 30 | A | This invention |
| 5 | 0 | 0 | C | Comparative example |
| 6 | 0.04 | 3.5 | C | Comparative example |
| 7 | — | — | A | Reference example |

As shown in the results of Table 2, it is understood that many black-dot defects occurred in both sample 5 of the comparative example containing no silica and sample 6 of the comparative example containing silica in an amount of less than 0.05 $g/m^2$. In contrast, almost no black-dot defects occurred in samples 1 to 4 of the present invention each containing silica in an amount of 0.05 $g/m^2$ or more.

Example 2

Preparation of Emulsion B and Emulsion Layer-Coating Liquid B

Emulsion B was prepared in the same manner as the preparation of the emulsion A in Example 1, except that the amount of gelatin (phthalation-treated gelatin) added in the Solution 1 was changed from 20 g to 8 g, and further the pH and the p Ag were adjusted to 6.4 and 7.5, respectively, without adding gelatin to the emulsion after washing and desalting. Further, an emulsion layer-coating liquid B was prepared using the emulsion B in the same manner as in Example 1. Further, the pH of the coating liquid B was adjusted to 5.6 using citric acid.

(Production of Inorganic EL Device Sample 8)

On a polyethyleneterephtharate film support, both surfaces thereof having been provided with a moisture barrier undercoat layer (underlayer) containing vinylidene chloride, a silver halide emulsion layer, a conductive fine particle layer and an adhesion-providing layer were coated in this order, whereby an inorganic EL device sample 8 was produced.

<Silver Halide Emulsion Layer>

The emulsion layer-coating liquid B thus prepared was coated on the undercoating layer to set the coating amounts of Ag and gelatin to 7.6 $g/m^2$ and 0.24 $g/m^2$, respectively.

<Conductive Fine Particle Layer>

The conductive fine particle layer was formed by coating the following Solution 6 in an amount of 10 $ml/m^2$ onto the above silver halide emulsion layer.

| Solution 6: | |
|---|---|
| Water | 1,000 ml |
| Gelatin | 20 g |
| Sb-doped tin oxide (trade name: SN100P, manufactured by Ishihara Sangyo Kaisha, Ltd.) | 40 g |

Furthermore, a surfactant, a preservative, and a pH adjustor were appropriately added thereto.

<Silica-Containing Layer (Adhesion-Providing Layer)>

The following Solution 7 was coated in an amount of 10 ml/m$^2$ on the aforementioned silver halide emulsion layer and conductive fine particle layer, whereby the adhesion-providing layer was applied thereon.

| Solution 7: | |
|---|---|
| Water | 992 ml |
| Colloidal silica (SYLYSIA (trade name), manufactured by FUJI SILYSIA CHEMICAL LTD.) | 8 g |

Furthermore, a surfactant, a preservative, and a pH adjustor were appropriately added thereto.

The silver halide emulsion layer, the conductive fine particle layer and the adhesion-providing layer were coated according to a simultaneous multilayer coating method, and were passed through a cold air set zone (5° C.). At the time when the coatings were passed through each set zone, the coating liquid showed sufficient set properties. Continuously, the coatings were dried at a dry zone. Herein, a generally known coating method may be used as the coating method.

The thus-obtained coating product was dried. The resultant was named Sample 8.

(Production of Inorganic EL Device Samples 9 to 14)

Inorganic EL device samples 9 to 13 were produced in the same manner as the inorganic EL device sample 8, except that the silica content of the aforementioned Solution 7 used for the adhesion-providing layer was changed as shown in Table 3.

Further, Sample 14 using ITO was produced as a reference example. The used ITO is a product manufactured by Kitagawa Industries Co., Ltd., having transmittance of 85% and haze of 1%.

(Exposure and Developing Process)

Next, Samples 8 to 14 prepared in the above were each exposed and subjected to developing treatment, in the same manner as in Example 1.

(Preparation of Electroluminescent Elements)

Samples 8 to 14 produced as described above were used to provide a dispersive inorganic EL element to make the light emission test, in the same manner as in Example 1.

(Evaluation)

With respect to Samples 8 to 14, the light-emitting luminance and adhesion properties were measured in the same manner as in Example 1.

The results are shown in Table 3.

TABLE 3

| Sample No. | Silica content (g/m$^2$) | Silica content (volume %) | Resistivity after steam treatment (Ω/□) | Adhesion properties (N) | Luminance (cd/m$^2$) | Remarks |
|---|---|---|---|---|---|---|
| 8 | 0.08 | 7 | 2 | 86 | 85.1 | This invention |
| 9 | 0.16 | 15 | 2.1 | 134 | 85.1 | This invention |
| 10 | 0.24 | 23 | 1.9 | 250 | 84.9 | This invention |
| 11 | 0.32 | 30 | 2 | 403 | 85.2 | This invention |
| 12 | 0 | 0 | 2 | 36 | 85 | Comparative example |
| 13 | 0.04 | 3.5 | 2.2 | 30 | 84.2 | Comparative example |
| 14 | — | — | 80 | 120 | 84.9 | Reference example |

In Sample 8, the Ag/Binder ratio of was 4.0/1, which is preferable Ag/Binder ratio in the present invention.

In Sample 8, the conductive fine particles were contained in the conductive fine particle layer in an mount of 0.4 g/m$^2$ and at a ratio by mass of the conductive fine particles to the binder of 2/1. In Sample 8, colloidal silica was also coated in an amount of 0.08 g/m$^2$. In order to examine the resistivity of the conductive fine particles alone (the conductive film resistivity), this coating sample 8 was subjected only to fixing treatment without being subjected to exposing/developing treatment. Thereafter, the surface resistivity excluding that of the silver halide was measured. As a result, it was $1\times10^{10}$ Ω/□.

The resistance of Sample 8 after development was 10Ω/□. Likewise, the resistance after a calendar treatment was 5Ω/□ and the resistance after a steam treatment was 2Ω/□. Herein, the calendar treatment and the steam treatment were carried out in the same manner as the methods described in JP-A-2008-251417.

The surface resistivity (unit: Ω/□) was measured with a digital ultra high resistance/microammeter 8340A (trade name, manufactured by ADC Corporation).

As shown in the results of Table 3, it is understood that both the sample 12 of the comparative example containing no silica and the sample 13 of the comparative example containing silica in an amount of less than 0.05 g/m$^2$ each had weak adhesion force. In contrast, the samples 8 to 11 of the present invention each containing silica in an amount of 0.05 g/m$^2$ or more each had excellent adhesion force. In particular, it is understood that the more the content of silica increased, the more the adhesion force was enhanced. When the content of silica was 0.16 g/m$^2$, the adhesion force became equal to or higher than that of the sample 14 of the reference example using ITO.

Further, it is understood that the samples 8 to 11 each show much lower resistance after the steam treatment than that of the sample 14 and have superiority in terms of uniform emission of light in the case of a large area device. Further, it is understood that in consideration of the opening portion of the samples 8 to 11 also having emitted light even after the steam treatment, there is no problem in that Sb-doped tin oxide conductive fine particles are fallen out by the steam treatment, which results in no emission of light in the opening portion.

Example 3

Samples were produced in the same manner as in the preparation of Sample 1 in Example 1, except that addition amount of each of the conductive fine particles and the binder (gelatin) in the conductive fine particle layer were changed, and the coating amount of the conductive fine particles and the ratio of conductive fine particles/binder were each changed, as shown in Table 4. After only fixing the thus-produced samples without conducting the exposure and development, the surface resistance excluding that of the silver halide of each sample was measured. The surface resistivity (unit: Ω/□) was measured with a digital ultra high resistance/microammeter 8340A (trade name, manufactured by ADC Corporation). The results are shown in Table 4.

TABLE 4

| Coating amount of conductive fine particles (g/m$^2$) | Ratio of (conductive fine particles)/binder | Surface resistivity (Ω/□) |
|---|---|---|
| 0.4 | 3 | $1.03 \times 10^8$ |
| 0.4 | 2.5 | $2.30 \times 10^9$ |
| 0.4 | 2 | $2.10 \times 10^{10}$ |
| 0.4 | 1.5 | $6.89 \times 10^{10}$ |
| 0.4 | 1 | $1.08 \times 10^{11}$ |
| 0.3 | 3 | $1.05 \times 10^9$ |
| 0.3 | 2.5 | $2.35 \times 10^{10}$ |
| 0.3 | 2 | $2.14 \times 10^{11}$ |
| 0.3 | 1.5 | $7.03 \times 10^{11}$ |
| 0.3 | 1 | $1.10 \times 10^{12}$ |
| 0.2 | 3 | $1.00 \times 10^{10}$ |
| 0.2 | 2.5 | $2.24 \times 10^{11}$ |
| 0.2 | 2 | $2.05 \times 10^{12}$ |
| 0.2 | 1.5 | $6.72 \times 10^{12}$ |
| 0.2 | 1 | $1.05 \times 10^{13}$ |
| 0.15 | 3 | $1.00 \times 10^{11}$ |
| 0.15 | 2.5 | $2.24 \times 10^{12}$ |
| 0.15 | 2 | $2.05 \times 10^{13}$ |
| 0.15 | 1.5 | $6.72 \times 10^{13}$ |
| 0.15 | 1 | $1.05 \times 10^{14}$ |
| 0.5 | 3 | $1.00 \times 10^7$ |
| 0.5 | 2.5 | $2.24 \times 10^8$ |
| 0.5 | 2 | $2.05 \times 10^9$ |
| 0.5 | 1.5 | $6.72 \times 10^{10}$ |
| 0.5 | 1 | $1.05 \times 10^{11}$ |

Next, samples were produced by changing a surface resistance of the opening portion and the pitch at the time of exposure as shown in Table 5. Specifically, inorganic EL device samples were produced under such various conditions of the value of surface resistance as $1\times10^7$Ω/□, $1\times10^8$Ω/□, $1\times10^9$Ω/□, $1\times10^{10}$Ω/□, $1\times10^{11}$ Ω/□, $1\times10^{12}$Ω/□ or $1\times10^{13}$Ω/□ by changing the coating amounts of the conductive fine particles and the binder. On this occasion, the samples were produced by changing the mask so that the mesh pitch at the time of exposure was 300, 600, 1,000, 2,000 or 5,000 μm (mesh resistance: 30 Ω/□, 80 Ω/□, 130 Ω/□, 250 Ω/□ or 500Ω/□). The luminance of each sample thus produced was measured. The results of measurement are shown in Table 5. Herein, the sample having luminance of 60 cd/m$^2$ or more is regarded as a sample having a practically acceptable luminance.

TABLE 5

| | | Mesh pitch (Mesh resistance) | | | | |
|---|---|---|---|---|---|---|
| | | 300 μm (30Ω/□) | 600 μm (80Ω/□) | 1,000 μm (130Ω/□) | 2,000 μm (250Ω/□) | 5,000 μm (500Ω/□) |
| Surface resistivity of opening portion | $1 \times 10^8$Ω/□ | 67.8 | 75.2 | 78.2 | 85.9 | 93.2 |
| | $1 \times 10^9$Ω/□ | 70.1 | 76.3 | 73 | 60.7 | 30 |
| | $1 \times 10^{10}$Ω/□ | 71.3 | 76 | 76.4 | 50 | 12 |
| | $1 \times 10^{11}$Ω/□ | 68.1 | 75.9 | 71.9 | 40.5 | 9.5 |
| | $1 \times 10^{12}$Ω/□ | 69.7 | 50.1 | 40.5 | 28.5 | 10 |
| | $1 \times 10^{13}$Ω/□ | 60 | 39.2 | 13.72 | 12.93 | 10.1 |
| | $1 \times 10^7$Ω/□ | 69 | 76 | 77.2 | 86 | 95 |

(Unit: cd/m$^2$)

As shown in the results of Table 5, it is understood that when the pitch was 300 even though the conductive property in terms of surface resistance was reduced up to $10^{13}$Ω/□, sufficient emission of light was obtained. In contrast, when the pitch was 5,000 μm, when the conductive property in terms of surface resistance was reduced to $10^8$Ω/□ or more, the luminance was also lowered. In view of these results, when the pitch is narrow, a silver mesh pitch is also narrow and therefore even though the resistance of the opening portion is high, voltage can be applied to the phosphor whereby light is emitted. In contrast, when the pitch is broad and the resistance of the opening portion is high, it is considered that voltage cannot be fully applied to phosphor, which results in difficulty in emission of light.

Having described our invention as related to the present embodiments, it is our intention that the present invention not be limited by any of the details of the description, unless otherwise specified, but rather be construed broadly within its spirit and scope as set out in the accompanying claims.

DESCRIPTION OF SYMBOLS

1 Inorganic EL device
2 Transparent electrode (Transparent conductive film)
3 Phosphor layer (Phosphor particles layer)
4 Reflection insulating layer (Dielectric layer)
5 Back electrode
6, 7 Electrode
8 Silver paste (Supplemental electrode)
9 Insulating paste
21 Transparent support
22 Undercoat layer (Gel layer)
23 Conductive fine particle-containing layer (Tin oxide layer)
24 Conductive layer (Silver mesh pattern)
25 Colloidal silica particle
31 Phosphor particle

What is claimed is:

1. An EL device, comprising:

a transparent support, a conductive layer, a phosphor layer, a reflection insulating layer, and a back electrode;

wherein the conductive layer, the phosphor layer, the reflection insulating layer and the back electrode are provided on the transparent support in this order, and wherein the conductive layer comprises silica in an amount of 0.05 $g/m^2$ or more.

2. The EL device according to claim 1, wherein the content of the silica is 0.16 $g/m^2$ or more.

3. The EL device according to claim 1, wherein the conductive layer comprises a first conductive layer, a second conductive layer having higher resistance than that of the first conductive layer, and a silica-containing layer containing the silica, and wherein the content of the silica in the silica-containing layer is 6% by volume or more.

* * * * *